No. 744,320. PATENTED NOV. 17, 1903.
W. FISCHER.
APPARATUS FOR LOADING MANURE OR OTHER MATERIALS.
APPLICATION FILED JAN. 31, 1903.
NO MODEL.
*Fig. I*
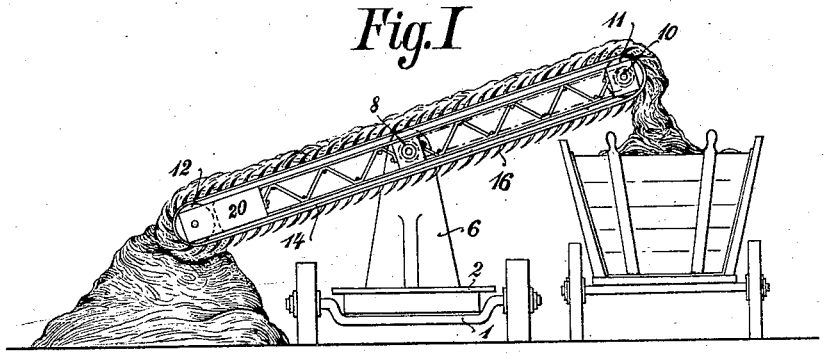
*Fig. II*
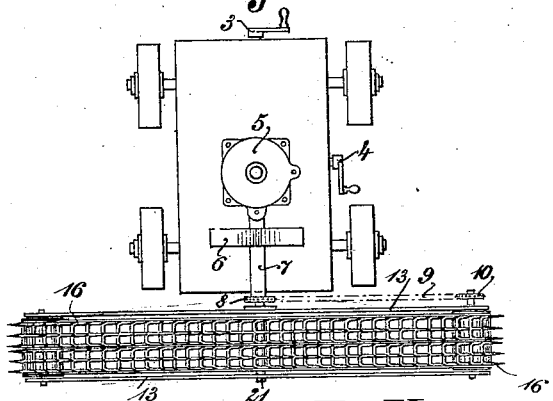
*Fig. III*
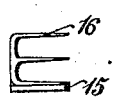
*Fig. IV*
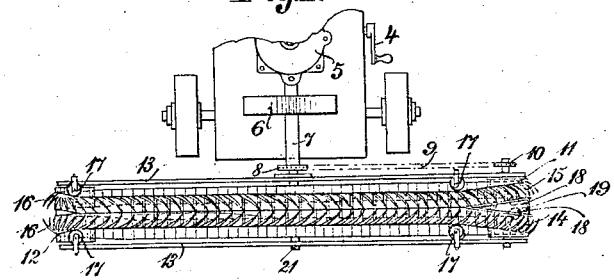

No. 744,320. Patented November 17, 1903.

UNITED STATES PATENT OFFICE.

WILHELM FISCHER, OF HALLE-ON-THE-SAALE, GERMANY.

APPARATUS FOR LOADING MANURE OR OTHER MATERIALS.

SPECIFICATION forming part of Letters Patent No. 744,320, dated November 17, 1903.

Application filed January 31, 1903. Serial No. 141,263. (No model.)

*To all whom it may concern:*

Be it known that I, WILHELM FISCHER, a subject of the King of Prussia, Emperor of Germany, residing at Halle-on-the-Saale, in the Kingdom of Prussia and German Empire, have invented certain new and useful Improvements in Apparatus for Loading Manure or other Materials upon Vehicles, of which the following is a specification.

This invention relates to means for loading manure and other materials from the ground upon vehicles, and has for its object to provide an improved apparatus for this purpose.

With this object in view the invention consists in the improved construction, arrangement, and combination of parts hereinafter fully described and afterward specifically claimed.

I have illustrated my invention in the accompanying drawings, in which—

Figure 1 represents the apparatus in elevation in the act of loading from a pile upon the earth on one side upon a vehicle on the other side. Fig. 2 is a top plan view of the apparatus. Fig. 3 is a detail view showing the construction of the teeth or prongs. Fig. 4 is a partial top plan view of a modified construction.

Like reference characters refer to the same parts in all the figures.

Referring specifically to the drawings, 1 indicates a truck upon which is mounted a base board or plate 2, which carries a motor 5 and trestle 6. The base-plate is horizontally adjustable upon the truck, either longitudinally or transversely, by any suitable means operated by cranks 3 and 4.

7 indicates the shaft of the motor, which passes through the trestle and carries a sprocket-wheel 8, which by means of a chain 9 drives a sprocket-wheel 10, mounted upon the shaft of a roller 11, which is mounted at one end, and a similar roller 12 at the opposite end of a frame 13, mounted to tilt upon a shaft 21 substantially in line with the motor-shaft 7, said frame being loaded with a weight 20 at the end which is designed to be nearest the ground or pile of the material to be loaded.

Two endless chains 14 and 15 are mounted upon the roller 11 and 12, said chains being provided with teeth or prongs 16 substantially of the form of manure-forks, which in the form of the device shown in Fig. 2 are intended to take up a portion of the material from the pile without changing the position of the teeth or of the chains and carry it upward along the upper side of the frame of the chains to a point above the vehicle into which it is continuously dumped by the teeth or prongs turned downward when the chain rotates about the roller 10, as shown in Fig. 1.

In Fig. 4, however, I have a somewhat-modified form in which the teeth instead of projecting forward only are projected forward and inward, and the chains are so guided by a roller 17 that the teeth are caused to approach and grasp a portion of the material at the period when they are rotating about the roller 12. The material thus grasped between the two chains 14 and 15 is carried upward as before until the chains reach the roller 10, where they encounter two leading rollers 18, disposed below the plate 19, by means of which the chains are separated and the teeth forced away from each other, so that the material is released and dumped into the vehicle.

When all the material in the pile has been carried up by the chains, the structure is adjusted by means of the cranks 3 and 4 to a new position and brought into operation upon other portions of the pile of material.

Having thus fully described my invention, what I claim to be new, and desire to secure by United States Letters Patent, is—

In an apparatus for loading material into vehicles, the combination with a tilting frame, of rollers mounted in the opposite ends thereof, two parallel endless chains around said rollers provided with teeth for engaging the material to be loaded, means at the lower end of the frame to bring the chains together and cause the teeth to grasp the material, and means at the upper end of the frame to separate the chains and cause the teeth to release the material, substantially as described.

In witness whereof I have hereunto set my hand in presence of two witnesses.

WILHELM FISCHER.

Witnesses:
MAX THIEME,
EDUARD CLAUDY.